United States Patent
McKay et al.

(10) Patent No.: US 11,694,106 B2
(45) Date of Patent: *Jul. 4, 2023

(54) QUANTUM COMPUTING DEVICE USING TWO GATE TYPES TO PREVENT FREQUENCY COLLISIONS IN SUPERCONDUCTING QUANTUM COMPUTERS

(71) Applicant: International Business Machines Corporation, Armonk, NY (US)

(72) Inventors: David C. McKay, Ossining, NY (US); Jay M. Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,039

(22) Filed: Jan. 6, 2023

(65) Prior Publication Data
US 2023/0153669 A1    May 18, 2023

Related U.S. Application Data

(63) Continuation of application No. 16/281,884, filed on Feb. 21, 2019, now Pat. No. 11,620,560.

(51) Int. Cl.
*G06N 10/00* (2022.01)

(52) U.S. Cl.
CPC .................. *G06N 10/00* (2019.01)

(58) Field of Classification Search
CPC ..................................................... G06N 10/00
See application file for complete search history.

(56) References Cited

U.S. PATENT DOCUMENTS

| | | | |
|---|---|---|---|
| 7,613,765 | B1 | 11/2009 | Hilton et al. |
| 9,685,935 | B2 | 6/2017 | Strand et al. |
| 10,042,805 | B2 | 8/2018 | Naaman et al. |
| 10,056,908 | B2 | 8/2018 | Rigetti et al. |
| 2017/0193388 | A1 | 7/2017 | Filipp et al. |
| 2017/0212860 | A1 | 7/2017 | Naaman et al. |
| 2017/0230050 | A1 | 8/2017 | Rigetti et al. |
| 2017/0308804 | A1 | 10/2017 | Wabnig et al. |

FOREIGN PATENT DOCUMENTS

| | | |
|---|---|---|
| WO | 2017115160 A1 | 7/2017 |
| WO | 2018236922 A1 | 12/2018 |
| WO | 2020169224 A1 | 8/2020 |

OTHER PUBLICATIONS

Chen et al., "Nonadiabatic Geometric Quantum Computation with Parametrically Tunable Coupling", Physical Review Applied, vol. 10, No. 5, Nov. 21, 2018, pp. 1-13.

(Continued)

*Primary Examiner* — Markus A. Vasquez
(74) *Attorney, Agent, or Firm* — Amin, Turocy & Watson, LLP

(57) ABSTRACT

A quantum computing device including a first plurality of qubits having a first resonance frequency and a second qubit having a second resonance frequency, the second resonance frequency being different from the first resonance frequency; and a first tunable frequency bus configured to couple the first plurality of qubits to the second qubit.

20 Claims, 3 Drawing Sheets

(56) References Cited

OTHER PUBLICATIONS

McKay et al., "Universal Gate for Fixed-Frequency Qubits via a Tunable Bus", Physical Review Applied, vol. 6, No. 6, Dec. 12, 2016, pp. 1-10. (11 pages total).
Sheldon et al., "Procedure for systematically tuning up cross-talk in the cross resonance gate", Physical Review A, vol. 93, No. 9, Jun. 24, 2016.
International Search Report with Written Opinion dated Mar. 12, 2020, issued by the International Searching Authority in International Application No. PCT/EP2019/082829.
Koch et al., "Charge insensitive qubit design derived from the Cooper pair box", Physical Review A, Mar. 2007, arXiv:cond-mat/0703002v2 [cond-mat.mes-hall] Sep. 26, 2007, pp. 1-21. (22 pages total).
IBM Research, "IBM Quantum Experience Device IBM Q 16," May 5, 2018, [Online], URL: https://quantumexperience.ng.bluemix.net [Accessed Apr. 23, 2020].
Magesan et al., "Effective Hamiltonian models of the cross-resonance gate", arxiv:1804.04073v2 [quant-ph] Feb. 25, 2019, pp. 1-16.
Hutchings et al., "Tunable Superconducting Qubits with Flux-Independent Coherence", Physical Review Applied 8, 044003-1-044003-13 (2017).
Examination Report No. 1 received for Australian Patent Application Serial No. 2019430032 dated Jul. 6, 2022, 3 pages.
Non-Final Office Action received for U.S. Appl. No. 16/281,884 dated Jul. 8, 2022, 36 pages.
List of IBM Patents or Applications Treated as Related.

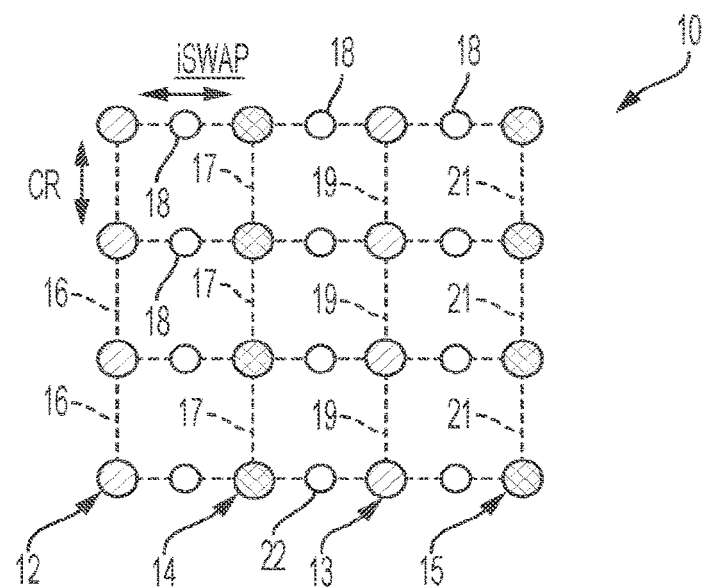
FIG. 1
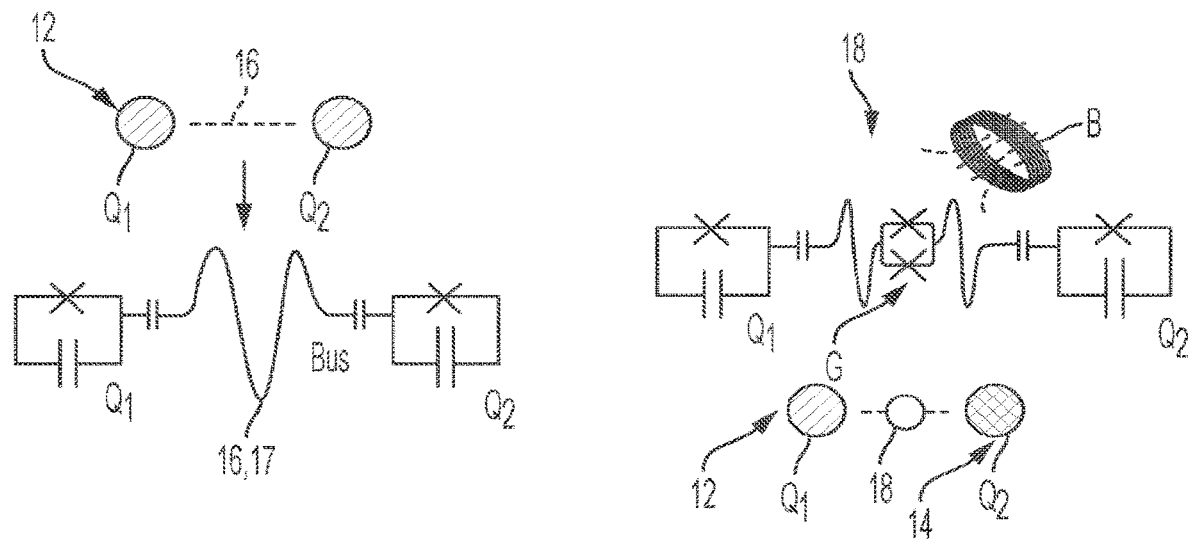
FIG. 2A
FIG. 2B

QUANTUM COMPUTING DEVICE USING TWO GATE TYPES TO PREVENT FREQUENCY COLLISIONS IN SUPERCONDUCTING QUANTUM COMPUTERS

STATEMENT REGARDING FEDERALLY SPONSORED RESEARCH OR DEVELOPMENT

This invention was made with Government support contract W911NF-14-1-0124 awarded by the Army Research Office (ARO). The Government has certain rights to this invention.

BACKGROUND

The currently claimed embodiments of the present invention relate to superconducting quantum computers, and more specifically, to superconducting quantum computers that combine two gate types to avoid frequency collisions.

Quantum computation is based on the reliable control of quantum bits (referred to herein throughout as qubits). The fundamental operations required to realize quantum algorithms are a set of single-qubit operations and two-qubit operations which establish correlations between two separate quantum bits. The realization of high fidelity two-qubit operations may be desirable both for reaching the error threshold for quantum computation and for reaching reliable quantum simulations.

Currently for superconducting qubits single-qubit gates are implemented with microwave controls. There are three main types of two-qubit gates: gates based on tunable frequency qubits, gates based on microwave-driven qubits (e.g., cross-resonance, flick fork, Bell Rabi, MAP, sideband transitions, and gates based on geometric phases (e.g., resonator-induced phase gate, holonomic gates)).

For gates based on tunable frequency qubits, the qubits themselves are tuned in frequency to activate a resonance interaction. These gates essentially have two operating points: an 'off'-position with essentially zero coupling and an 'on' position when the qubits have a strong two-qubit interaction. These gates have a very good on-off ratio, but because the qubits are tunable via externally applied magnetic flux, they can be limited by 1/f noise which limits the coherence of the qubits to a few microseconds.

For gates based on microwave-driven qubits, the qubits can he designed to be fixed in frequency so they are immune to flux noise. However, microwave pulses are required to activate the gate. The problems with these gates are that they have a low on/off ratio and are very hard to address the gate of interest without activating unwanted interactions.

Gates based on geometric phases are based on the path of the quantum state in its state space and the acquired quantum phase associated with its excursion. Adiabatic geometric gates are robust against certain types of noise, but are generally slow and require controls to adiabatic. Non-adiabatic gates can be faster and potentially share the noise-resilience of their adiabatic cousins.

Superconducting Josephson junction qubits are a promising technology for building a quantum computer. The transmon-type of superconducting qubits is operated at a relatively high ratio of Josephson energy to charging energy that allows the transmon (transmission-line shunted plasma oscillation) qubit to operate at reduced charge noise sensitivity while still allowing coupling between qubits and between the qubits and the transmission line or bus. This allows transmon qubits to be coupled in a 2D arrangement with nearest neighbor interactions (for example in a two-dimensional lattice) via fixed-frequency microwave resonators. Fixed frequency transmon qubits (single-junction transmons) are highly coherent (i.e., essentially having a single resonance frequency). Therefore, there is a need to enable interactions between qubits. Cross-Resonance (CR) interaction between qubits can be used to couple the qubits. In Cross-Resonance, the qubits are driven with microwave tones at the frequency of the neighboring qubits to establish interaction between the qubits. To enable CR interaction between a plurality of qubits, the qubits are relatively closely spaced in frequency (for example less than 200 MHz). However, this leads to frequency collision issues and crosstalk between the qubits.

As future quantum computers may use a large number of qubits (hundreds to thousands, or more), it may be desirable to limit frequency collision or crosstalk between qubits. While CR may provide benefits in allowing coupling between neighboring qubits, CR may not be adequate for establishing coupling between farther away located qubits. Hence, a need remains for a solution that cures the frequency collision issue and crosstalk when using CR to couple qubits.

SUMMARY

An aspect of the present invention is to provide a quantum computing device including a first plurality of qubits having a first resonance frequency and a second qubit having a second resonance frequency, the second resonance frequency being different from the first resonance frequency. The quantum computing device also includes a first fixed frequency bus configured to couple the first plurality of qubits, the first plurality of qubits being configured to interact via cross-resonance through the first fixed frequency bus. The quantum computing device further includes a first tunable frequency bus configured to couple at least one of the first plurality of qubits to the second qubit.

In an embodiment, the quantum computing device further includes a second plurality of qubits having the second resonance frequency; and a second fixed frequency bus configured to couple the second plurality of qubits, the second plurality of qubits being configured to interact via cross-resonance through the second fixed frequency bus. In an embodiment, the first plurality of qubits are arranged in one of a first row or in a first column and are configured to interact via cross-resonance through the first fixed frequency bus, and the second plurality of qubits are arranged in one of a second row or in a second column and are configured to interact via cross-resonance through the second fixed frequency bus.

In an embodiment, the quantum computing device further includes a third plurality of qubits having the first resonance frequency, the third plurality of qubits being arranged in one of a third row or in a third column; and a third fixed frequency bus configured to couple the third plurality of qubits, the third plurality of qubits being configured to interact via cross-resonance through the third fixed frequency bus.

In an embodiment, the first plurality of qubits arranged in the first row or in the first column are configured to interact with the second plurality of qubits arranged in the second row or the second column via the first tunable frequency bus and the second plurality of qubits arranged in the second row or in the second column are configured to interact with the third plurality of qubits arranged in the third row or the third column via the first tunable frequency bus. In an embodiment, the second plurality of qubits are arranged between the first plurality of qubits and the third plurality of qubits so as to prevent cross-resonance interaction between the first plurality of qubits and the third plurality of qubits.

In an embodiment, the quantum computing device further includes a third plurality of qubits having a third resonance frequency, the third plurality of qubits being arranged in one of a third row or in a third column, the third resonance frequency being different from the first resonance frequency and different from the second resonance frequency; a third fixed frequency bus configured to couple the third plurality of qubits, the third plurality of qubits being configured to interact via cross-resonance through the third fixed frequency bus; and a second tunable frequency bus configured to couple at least one of the third plurality of qubits to the second plurality of qubits.

In an embodiment, the first plurality of qubits arranged in the first row or in the first column are configured to interact with the second plurality of qubits arranged in the second row or the second column via the first tunable frequency bus, and the second plurality of qubits arranged in the second row or in the second column are configured to interact with the third plurality of qubits arranged in the third row or the third column via the second tunable frequency bus.

Another aspect of the present invention is to provide another quantum computing device. The quantum computing device includes a first plurality of qubits having a first resonance frequency and a second qubit having a second resonance frequency, the second resonance frequency being different from the first resonance frequency. The quantum computing device further includes a first tunable frequency bus configured to couple the first plurality of qubits to the second qubit.

In an embodiment, the first plurality of qubits are configured to interact with each other through the first tunable frequency bus via cross-resonance. In an embodiment, at least one of the first plurality of qubits and the second qubit are configured to interact through a parametric iSWAP gate.

In an embodiment, the first plurality of qubits comprise three qubits, the three qubits being configured to interact with each other through the first tunable frequency bus via cross-resonance, and the second qubit being configured to interact with the three qubits through the first tunable frequency bus via a parametric iSWAP gate.

In an embodiment, the quantum computing device further includes a second plurality of qubits having the second resonance frequency and a third qubit having the first resonance frequency; and a second tunable frequency bus configured to couple the third qubit to the second plurality of qubits. In an embodiment, the second plurality of qubits are configured to interact with each other through the second tunable frequency bus via cross-resonance. In an embodiment, the third qubit is prevented from interacting via cross-resonance with the first plurality of qubits.

In an embodiment the quantum computing device further includes a second plurality of qubits having the second resonance frequency and a third qubit having a third resonance frequency, the third resonance frequency being different from the first resonance frequency and the second resonance frequency; and a second tunable frequency bus configured to couple the third qubit to the second plurality of qubits.

Another aspect of the present invention is to provide a method of producing a quantum computing device. The method includes producing a first plurality of qubits having a first resonance frequency and a second qubit having a second resonance frequency on a qubit chip, the second frequency being different from the first frequency; at least one of producing a first fixed frequency bus on the qubit chip or attaching the qubit chip to a chip comprising the first frequency bus so as to enable interaction between the first plurality of qubits via cross-resonance; and at least one of producing a first tunable frequency bus on the qubit chip or attaching the qubit chip to a chip comprising the first tunable frequency bus so as to enable coupling at least one of the first plurality of qubits to the second qubit using the first tunable frequency bus.

Yet another aspect of the present invention is to provide a method of producing a quantum computing device. The method includes producing a first plurality of qubits having a first resonance frequency and a second qubit having a second resonance frequency on a qubit chip, the second frequency being different from the first frequency; and at least one of producing a first tunable frequency bus on the qubit chip or attaching the qubit chip to a chip comprising the first tunable frequency bus so as to enable coupling at least one of the first plurality of qubits to the second qubit using the first tunable frequency bus.

The frequency of a qubit corresponds to the transition energy between two states of the qubit being used, for example between the ground state and the first excited state. A qubit has two quantum states (e.g., ground state and first excited state) that are sufficiently separated in energy to form separated energy levels and/or decoupled from any additional quantum states so that the qubit is approximately a two-quantum state structure under operation conditions. The transition energy between the two states defines the resonance frequency of the qubit. For some qubits, the transition energy can be modified, for example, by the application of a magnetic field.

The term "resonance frequency" of a qubit as used in this specification corresponds to the frequency resonant with the energy separation between two energy levels of the qubit (e.g., ground state energy level and excited state energy level). The resonance frequency defines the energy transition from one energy level to another energy level. Each "energy level" of a qubit corresponds to an energy level defined within a relatively narrower bandwidth of energies or frequencies. The term "narrower" is used herein to mean that the bandwidth is smaller than the transition energy between the energy states of the qubit. For example, the production of a plurality of qubits that are intended to have the same resonance frequency may actually result in qubits with small differences in resonance frequency, but still within the bandwidth.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

FIG. 1 is a schematic diagram of a quantum computing device having a plurality of qubits, according to an embodiment of the present invention;

FIG. 2A is a schematic diagram of a quantum circuit including two qubits interacting via a first fixed frequency bus (CR bus), according to an embodiment of the present invention;

FIG. 2B is a schematic diagram of a quantum circuit including two qubits interacting via a first tunable frequency bus, according to an embodiment of the present invention;

DETAILED DESCRIPTION

Figure 3:
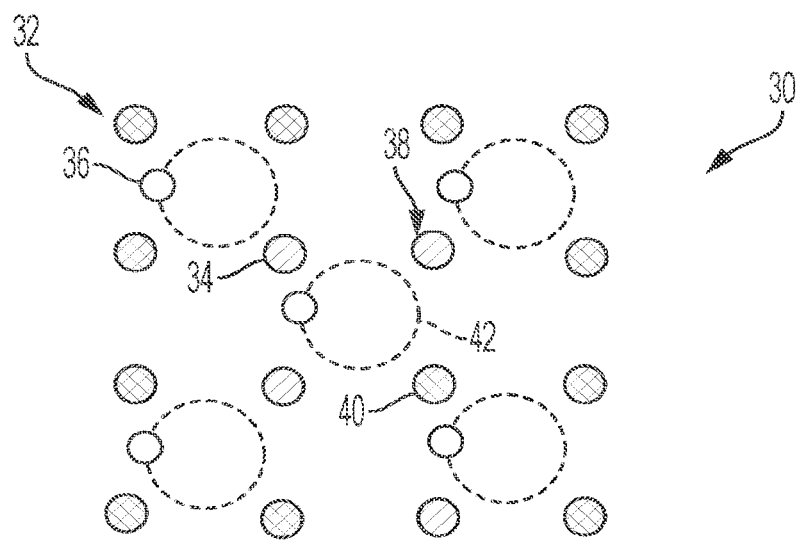
FIG. 3 is a schematic diagram of a quantum computing device having a plurality of qubits, according to another embodiment of the present invention.

FIG. 1 is a schematic diagram of a quantum computing device having a plurality of qubits, according to an embodiment of the present invention. The quantum computing device 10 includes a first plurality of qubits 12 having a first resonance frequency. The quantum computing device 10 further includes a second qubit or a second plurality of qubits 14 having a second resonance frequency. The second resonance frequency is different from the first resonance frequency. For example, the second resonance frequency of the second qubit or the second plurality of qubits can be relatively higher than the first resonance frequency of the first plurality of qubit. For example, the first plurality of qubits may have a first resonance frequency in the range 4.8-5.0 GHz and the second qubit or qubits may have a second resonance frequency in the range 5.6-5.8 GHz.

Although four first qubits are shown in FIG. 1, as it must be appreciated two or more qubits can be used. Similarly, although four second qubits are shown in FIG. 1, as it must be appreciated one, two or more second qubits can be used. However, in practical implementations, often more than two first qubits and more than two second qubits are used.

As shown in FIG. 1, the quantum computing device 10 further includes a first fixed frequency bus 16 (depicted as a dotted line) configured to couple the first plurality of qubits 12. The first plurality of qubits 12 are configured to interact via cross-resonance (CR) through the first fixed frequency bus 16. The quantum computing device 10 further includes a first tunable frequency bus 18 configured to couple at least one of the first plurality of qubits 12 to a second qubit 14. In an embodiment, the first tunable frequency bus 18 is configured to couple the first plurality of qubits 12 (for example four as shown in FIG. 1) to a second plurality of qubits 14 (for example four as shown in FIG. 1). In an embodiment, the first tunable frequency bus 18 is configured to couple the at least one of the first plurality of qubits 12 and the second qubit 14 through a parametric iSWAP gate. In an embodiment, the first tunable frequency bus 18 is configured to couple the first plurality of qubits 12 and the second plurality of qubits 14 through the parametric iSWAP gate.

In an embodiment, the quantum computing device 10 further includes a second fixed frequency bus 17 configured to couple the second plurality of qubits 14. The second plurality of qubits 14 are configured to interact via cross-resonance (CR) through the second fixed frequency bus 17.

FIG. 2A is a schematic diagram of a quantum circuit including two qubits interacting via the first fixed frequency bus (CR bus), according to an embodiment of the present invention. As shown in FIG. 2A, first qubit $Q_1$ in the first plurality of qubits 12 and second qubit $Q_2$ in the first plurality of qubits 12 interact via first fixed frequency bus 16 (CR bus). In an embodiment, the first fixed frequency bus 16 is a microwave transmission line connecting qubit $Q_1$ to qubit $Q_2$. Similarly, although not illustrated in FIG. 2A, first qubit $Q_1$ in the second plurality of qubits 14 and second qubit $Q_2$ in the second plurality of qubits 14 interact via second fixed frequency bus (CR bus) 17. In an embodiment, the second fixed frequency bus 17 is a microwave transmission line connecting qubit $Q_1$ to qubit $Q_2$. In the qubits $Q_1$ and $Q_2$, the vertical lines "||" correspond to a capacitance and the "X" symbol corresponds to a Josephson junction. Although the qubit is shown having a single Josephson Junction (JJ) and a single capacitance, any number of Josephson junctions and any number of capacitances can be used. In addition, other elements can also be included in the circuit of the qubits $Q_1$ and $Q_2$ and first fixed frequency bus 16 (CR bus) and/or second fixed frequency bus 17 (CR bus).

FIG. 2B is a schematic diagram of a quantum circuit including two qubits interacting via the first tunable frequency bus 18, according to an embodiment of the present invention. As shown in FIG. 2B, first qubit $Q_1$ in the first plurality of qubits 12 and second qubit $Q_2$ in the first plurality of qubits 12 interact via first tunable frequency bus 18 (for example via a parametric iSWAP gate). In an embodiment, as shown in FIG. 2B, the first tunable frequency bus 18 includes a gate (e.g., a parametric iSWAP gate) "G" that connects qubit $Q_1$ to qubit $Q_2$ via a transmission line. The gate "G" is activated by applying a magnetic field "B". Similar to FIG. 2A, in the qubits $Q_1$ and $Q_2$, the vertical lines "||" correspond to a capacitance and the "X" symbol corresponds to a Josephson junction. Although the qubits $Q_1$ and $Q_2$ are shown having a single Josephson junction and a single capacitance, any number of Josephson junctions and any number of capacitances can be used. In addition, other elements can also be included in the circuit of the qubits $Q_1$ and $Q_2$. In addition, although the first tunable frequency bus 18 is shown having gate "G" (e.g., parametric iSWAP gate) using two Josephson junctions, as it can be appreciated, other types of gates can be used that use another number of Josephson junctions. In an embodiment, the first tunable frequency bus 18 includes a superconducting quantum interference device (SQUID). The term parametric iSWAP gate is understood in the superconducting quantum computing art as being a gate that performs a swap in the phase matrix through the imaginary number "i".

As shown in FIG. 1, the first plurality of qubits 12 are arranged a column. However, the first plurality of qubits 12 can also be arranged in a first row. The first plurality of qubits 12 are configured to interact via cross-resonance (CR) through the first fixed frequency bus 16. As also shown in FIG. 1, the second plurality of qubits 14 are arranged in a second column. However, the second plurality of qubits 14 can also be arranged in a second row. The second plurality of qubits 14 are configured to interact via cross-resonance (CR) through the second fixed frequency bus 17.

As also shown in FIG. 1, in an embodiment, the quantum computing device 10 also includes a third plurality of qubits 13 having the first resonance frequency similar to the first plurality of qubits 12. As shown in FIG. 1, the third plurality of qubits 13 are arranged in a third column. However, the third plurality of qubits 13 can also be arranged in a third row. The quantum computing device further includes a third fixed frequency bus 19 configured to couple the third plurality of qubits 13. The third plurality of qubits 13 are configured to interact via cross-resonance (CR) through the third fixed frequency bus 19.

As also shown in FIG. 1, in an embodiment, the quantum computing device 10 also includes a fourth plurality of qubits 15 having the second resonance frequency similar to the second plurality of qubits 14. As shown in FIG. 1, the fourth plurality of qubits 15 are arranged in a fourth column. However, the fourth plurality of qubits 15 can also be arranged in a fourth row. The quantum computing device 10 further includes a fourth fixed frequency bus 21 configured to couple the fourth plurality of qubits 15. The fourth plurality of qubits 15 are configured to interact via cross-resonance (CR) through the fourth fixed frequency bus 21.

In an embodiment, the first plurality of qubits 12 arranged in the first row or in the first column are configured to interact with the second plurality of qubits 14 arranged in the second row or the second column via the first tunable frequency bus 18. In an embodiment, the second plurality of qubits 14 arranged in the second row or in the second column are configured to interact with the third plurality of qubits 13 arranged in the third row or the third column via the first tunable frequency bus 18. In an embodiment, the third plurality of qubits 13 arranged in the third row or in the third column are configured to interact with the fourth plurality of qubits 15 arranged in the fourth row or the fourth column via the first tunable frequency bus 18.

In an embodiment, the second plurality of qubits 14 are arranged between the first plurality of qubits 12 and the third plurality of qubits 13 so as to prevent cross-resonance interaction, and thus substantially reduce or eliminate frequency collision and crosstalk, between the first plurality of qubits and the third plurality of qubits 13. Similarly, the third plurality of qubits 13 are arranged between the second plurality of qubits 14 and the fourth plurality of qubits 15 so as to prevent cross-resonance interaction, and thus substantially reduce or eliminate frequency collision and crosstalk, between the second plurality of qubits 14 and the fourth plurality of qubits 15.

In an embodiment, the third plurality of qubits 13 have a third resonance frequency. The third plurality of qubits 13 are arranged in a third column, as shown in FIG. 1. However, the third plurality of qubits 13 can also be arranged in a third row. In this embodiment, however, the third resonance frequency is different from the first resonance frequency of the first plurality of qubits 12 and different from the second resonance frequency of the second plurality of qubits 14. In an embodiment, the third fixed frequency bus 19 is configured to couple the third plurality of qubits 13. The third plurality of qubits 13 are configured to interact via cross-resonance (CR) through the third fixed frequency bus 19. In an embodiment, the quantum computing device includes a second tunable frequency bus 22 that is configured to couple at least one of the third plurality of qubits 13 to the second plurality of qubits 14.

In an embodiment, the first plurality of qubits 12 arranged in the first row or in the first column are configured to interact with the second plurality of qubits 14 arranged in the second row or the second column via the first tunable frequency bus 18. In an embodiment, the second plurality of qubits 14 arranged in the second row or in the second column are configured to interact with the third plurality of qubits 13 arranged in the third row or the third column via the second tunable frequency bus 22.

In an embodiment, the first, the second, the third and/or fourth plurality of qubits can be transmon qubits.

FIG. 3 is a schematic diagram of a quantum computing device having a plurality of qubits, according to another embodiment of the present invention. The quantum computing device 30 includes a first plurality of qubits 32 having a first resonance frequency and a second qubit 34 having a second resonance frequency. The second resonance frequency is different from the first resonance frequency. In an embodiment, the second frequency is higher than the first frequency, for example. In an embodiment, for example the second frequency can be in the range 4.8-5.0 GHz and the first frequency can be in the range 5.6-5.8 GHz. The quantum computing device further includes a first tunable frequency bus 36 configured to couple the first plurality of qubits 32 to the second qubit 34.

In an embodiment, the first plurality of qubits 32 are configured to interact with each other through the first tunable frequency bus 36 via cross-resonance (CR).

Figure 4A:
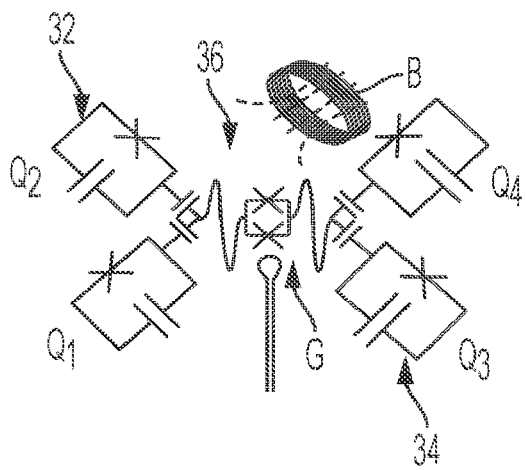
FIG. 4A shows a schematic diagram of a quantum circuit including four qubits interacting via a first tunable frequency bus, according to an embodiment of the present invention.
Figure 4B:
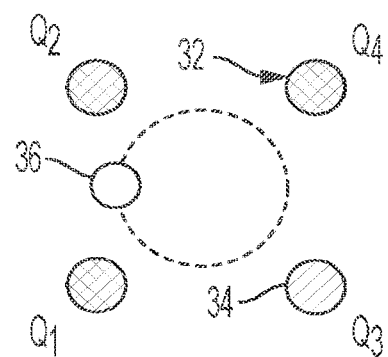
FIG. 4B shows a schematic diagram of four qubits interacting via the first tunable frequency bus, according to embodiment of the present invention.
Figure 4C:
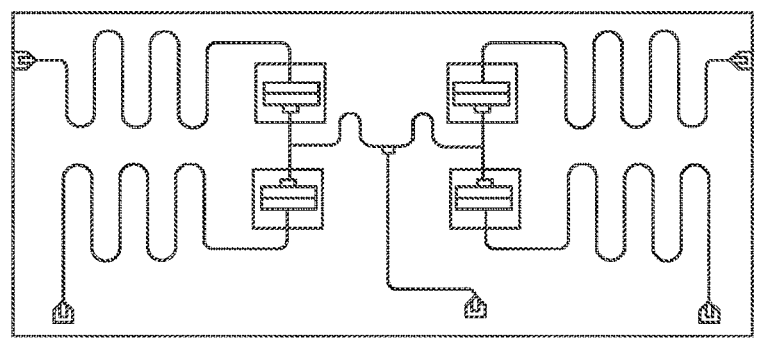
FIG. 4C is an image of a quantum computing device on a chip including four qubits and a tunable frequency bus, according to an embodiment of the present disclosure.

FIG. 4A shows a schematic diagram of a quantum circuit including four qubits interacting via the first tunable frequency bus 36, according to an embodiment of the present invention. FIG. 4B shows a schematic diagram of four qubits interacting via the first tunable frequency bus 36, according to embodiment of the present invention. FIG. 4C is an image of a quantum computing device on a chip including four qubits and a tunable frequency bus, according to an embodiment of the present disclosure. As shown in FIG. 4A, qubits $Q_1$, $Q_2$ and $Q_4$ of the first plurality of qubits 32 interact with each other and with the qubit $Q_3$ corresponding to the second qubit 34 via the first tunable frequency bus 36 (for example, via a parametric iSWAP gate).

In an embodiment, as shown in FIG. 4A, the first tunable frequency bus 36 includes a gate (e.g., a parametric iSWAP gate) "G" that connects qubits $Q_1$, $Q_2$, $Q_3$, and $Q_4$ using a transmission lines connected to quantum gate "G". The gate "G" is activated by applying a magnetic field "B". In the qubits $Q_1$, $Q_2$, $Q_3$, and $Q_4$ the vertical lines "||" correspond to a capacitance and the "X" symbol corresponds to a Josephson junction. Although the qubits $Q_1$, $Q_2$, $Q_3$, and $Q_4$ are shown having a single Josephson junction and a single capacitance, any number of Josephson junctions and any number of capacitances can be used. In addition, other elements can also be included in the circuit of the qubits $Q_1$, $Q_2$, $Q_3$, and $Q_4$. In addition, although the first tunable frequency bus 36 is shown having gate "G" (e.g., parametric iSWAP gate) using two Josephson junctions, as it can be appreciated, other types of gates can be used that use another number of Josephson junctions. In an embodiment, the first tunable frequency bus 36 includes a superconducting quantum interference device (SQUID). Therefore, in an embodiment, the first plurality of qubits 32 and the second qubit 34 are configured to interact the first tunable frequency bus 36 (via a parametric iSWAP gate).

In an embodiment, as shown in FIGS. 3, 4A and 4B, the first plurality of qubits 32 comprise three qubits (for example, $Q_1$, $Q_2$ and $Q_4$). The three qubits 32 ($Q_1$, $Q_2$ and $Q_4$) are configured to interact with each other through the first tunable frequency bus 36 via cross-resonance (CR). The second qubit 34 ($Q_3$) is configured to interact with the three qubits 32 ($Q_1$, $Q_2$ and $Q_4$) through the first tunable frequency bus 36 (via a parametric iSWAP gate).

Figure 5A:
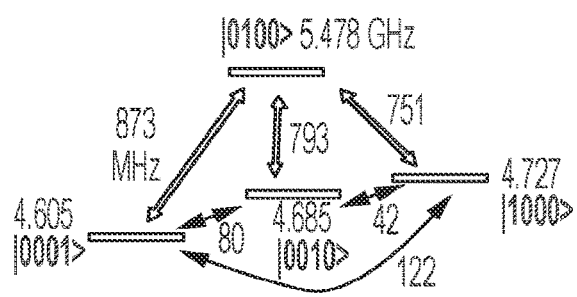
FIG. 5A is an energy diagram showing the first excited energy levels of four qubits $Q_1$, $Q_2$, $Q_3$ and $Q_4$, according to an embodiment of the present invention.

FIG. 5A is an energy diagram showing the first excited energy levels of the four qubits $Q_1$, $Q_2$, $Q_3$ and $Q_4$, according to an embodiment of the present invention. The first excited energy level of qubit $Q_1$ is denoted as |0001>, the first excited energy level of qubit $Q_2$ is denoted as |0010>, the first excited energy level of qubit $Q_4$ is denoted as |1000>, and the first excited energy level of qubit $Q_3$ is denoted as |0100>. The frequencies noted above each excited energy state correspond to a transition energy (or frequency) between the ground state (energy or frequency equal to zero) and the first excited energy level, respectively, 4.605 GHz for $Q_1$, 4.685 GHz for $Q_2$, 4.727 for $Q_4$ and 5.478 for $Q_3$. As shown in FIG. 5A, the excited energy levels |0001>, |0010> and |1000> of qubits $Q_1$, $Q_2$, and $Q_4$, respectively, are close to each other with a difference in energy between |0001> and |0010> of 80 MHz, between |0010> and |1000> of 42 MHz, and between |0001> and |1000> of 122 MHz. This allows qubits $Q_1$, $Q_2$, and $Q_4$ to interact via CR. On the other hand, the difference in energy between the excited energy level |0100> of qubit $Q_3$ and energy levels |0001> of qubit $Q_1$, between the excited energy level |0100> of qubit $Q_3$ and energy level |0010> of qubit $Q_2$ and between the excited energy level |0100> of qubit $Q_3$ and energy level |1000> of qubit $Q_4$ is, respectively, 873 MHz, 793 MHZ and 751 MHz. which is greater than any of 80 MHz, 42 MHz and 122 MHz. As a result, in this case interaction between qubits $Q_1$, $Q_2$, $Q_4$ and $Q_3$ is enabled by the first tunable frequency bus 36 (using for example the parametric iSWAP gate). The inventors implemented a quantum computing device with the four qubits $Q_1$, $Q_2$, $Q_3$ and $Q_4$ coupled to a tunable frequency bus using a parametric iSWAP gate. The inventor reported results that show successful implementation of the interaction between the various qubits. The inventors plotted the results.

Figure 6:
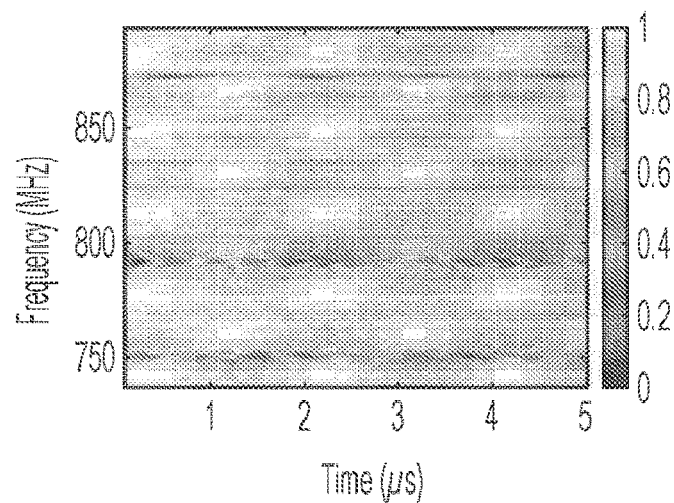
FIG. 6 is a plot of the population in qubit $Q_3$ as a function of the frequency modulating the tunable bus versus time, in accordance with an embodiment of the present invention.

FIG. 6 is a plot of the population in qubit $Q_3$ as a function of the frequency modulating the tunable bus versus time, in accordance with an embodiment of the present invention. Regions where population in qubit $Q_3$ decreases correspond to the difference in frequency (energy) between the excited energy levels. The plot shows the difference in energy (or frequency) between the excited energy level |0100> of qubit $Q_3$ and energy levels |0001> of qubit $Q_1$, between the excited energy level |0100> of qubit $Q_3$ and energy level |0010> of qubit $Q_2$, and between the excited energy level |0100> of qubit $Q_3$ and energy level |1000> of qubit $Q_4$ is, respectively, 873 MHz, 793 MHZ and 751 MHz. The plot shows that the interaction is stable over at least a time frame of 5 µs and gives typical timescales for the interaction (less than about 1 µs).

Figure 5B:
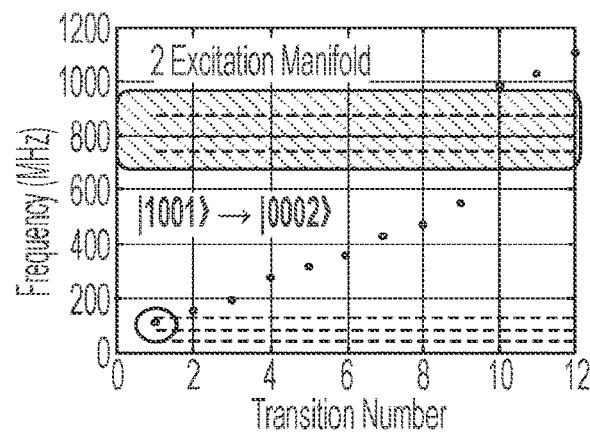
FIG. 5B is a plot of the energy or frequency of the first excited energy levels of the four qubits $Q_1$, $Q_2$, $Q_3$ and $Q_4$, according to an embodiment of the present invention.

FIG. 5B is a plot of the energy or frequency difference of the first excited energy levels of the four qubits $Q_1$, $Q_2$, $Q_3$ and $Q_4$, according to an embodiment of the present invention. The three lower horizontal lines in the plot that are below about 200 MHZ correspond to transitions between the three states |0001>, |0010> and |1000> of qubits $Q_1$, $Q_2$ and $Q_4$. These three are located within a relatively narrower bandwidth of energies or frequencies. The term "narrower" is used herein to mean that the bandwidth (about 122 MHz in this case) is smaller than the difference in energy (around 800 MHz) between the energy states of each of three qubits and the fourth qubit. The three upper horizontal lines in the plot that are between about 750 MHz and about 900 MHz correspond to the excitation manifold that includes the excited energy level |0100> of qubit $Q_3$. Transitions out of the qubit space (e.g., a transition between state |1001> and state |0002>), lie between the lower horizontal lines and the upper horizontal lines in the plot. This plot demonstrates that the tunable bus interaction is not sufficient on its own because transitions between similar frequency qubits are within the same bandwidth as transitions out of the qubit subspace.

Returning to FIG. 3, the quantum computing device 30 further includes a second plurality of qubits 38 having the second resonance frequency and a third qubit 40 having the first resonance frequency. The quantum computing device 30 further includes a second tunable frequency bus 42 configured to couple the third qubit 40 to the second plurality of qubits 38. In an embodiment, the second plurality of qubits 38 include the second qubit 34.

In an embodiment, the second plurality of qubits 38 are configured to interact with each other through the second tunable frequency bus 42 via cross-resonance (CR). In an embodiment, the third qubit 40 and the second plurality of qubits 38 are configured to interact through the second tunable frequency bus 42 (via parametric iSWAP gate). In an embodiment, the third qubit 40 is prevented from interacting via cross-resonance with the first plurality of qubits 32.

In an embodiment, the quantum computing device 30 further includes a second plurality of qubits 38 having the second resonance frequency and a third qubit 40 having a third resonance frequency. In this embodiment, the third resonance frequency is different from the first resonance frequency of the first plurality of qubits 32 and from the second resonance frequency of the second plurality of qubits 38. The second tunable frequency bus 42 is configured to couple the third qubit 40 to the second plurality of qubits 38. In an embodiment, the second plurality of qubits 38 are configured to interact with each other through the second tunable frequency bus 42 via cross-resonance (CR). In an embodiment, the third qubit 40 and the second plurality of qubits 38 are configured to interact through the second tunable frequency bus 42 via a parametric iSWAP gate.

In an embodiment, the second plurality of qubits 38 comprise three qubits. The three qubits are configured to interact with each other through the second tunable frequency bus 42 via cross-resonance (CR), and the third qubit 40 is configured to interact with the three qubits 38 through the second tunable frequency bus 42 via a parametric iSWAP gate.

As it can be appreciated from the above paragraphs there is also provided a method of producing a quantum computing device (e.g., the quantum computing device 10), according to an embodiment of the present invention. The method includes producing a first plurality of qubits 12 having a first resonance frequency and a second qubit 14 having a second resonance frequency on a qubit chip (for example as shown FIG. 4C). The second frequency is different from the first frequency. The method further includes at least one of producing a first fixed frequency bus 16 on the qubit chip or attaching the qubit chip to a chip comprising the first fixed frequency bus 16 so as to enable interaction between the first plurality of qubits 12 via cross-resonance (CR). The method also includes at least one of producing a first tunable frequency bus 18 on the qubit chip or attaching the qubit chip to a chip comprising the first tunable frequency bus 18 so as to enable coupling at least one of the first plurality of qubits 12 to the second qubit 14 using the first tunable frequency bus 18.

According to an embodiment of the present invention, as it can be appreciated from the above paragraphs, there is further provided a method of producing a quantum computing device (for example, quantum computing device 30).

The method includes producing a first plurality of qubits 32 having a first resonance frequency and a second qubit 34 having a second resonance frequency on a qubit chip (for example the qubit chip shown in FIG. 4C). The second frequency is different from the first frequency. The method also includes at least one of producing a first tunable frequency bus 36 on the qubit chip or attaching the qubit chip to a chip comprising the first tunable frequency bus 36 so as to enable coupling at least one of the first plurality of qubits 32 to the second qubit 34 using the first tunable frequency bus 36.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A quantum computing device, comprising:
   a plurality of qubits having respective resonance frequencies, wherein at least two qubits of the plurality of qubits have different resonance frequencies; and
   a plurality of frequency buses configured to couple the plurality of qubits; and
   wherein pairs of adjacent qubits of the plurality of qubits having a same resonance frequency are only coupled via cross-resonance, and pairs of adjacent qubits of the plurality of qubits having different resonance frequencies are only coupled via respective parametric iSWAP gates, and wherein each pair of adjacent qubits of the plurality of qubits does not have an intervening qubit on an associated frequency bus connecting the pair of adjacent qubits.

2. The quantum computing device of claim 1, wherein at least one frequency bus of the plurality of frequency buses is a fixed frequency bus.

3. The quantum computing device of claim 2, wherein the fixed frequency bus is configured to couple a pair of the pairs of adjacent qubits via cross-resonance.

4. The quantum computing device of claim 1, wherein at least one frequency bus of the plurality of frequency buses is a tunable frequency bus.

5. The quantum computing device of claim 4, wherein the tunable frequency bus is configured to couple a pair of the pairs of adjacent qubits via cross-resonance.

6. The quantum computing device of claim 4, wherein the tunable frequency bus comprises a superconducting quantum interference device.

7. The quantum computing device of claim 1, wherein the plurality of qubits are arranged in columns and rows.

8. The quantum computing device of claim 7, wherein the columns of the qubits are coupled via respective frequency buses of a subset of the plurality of frequency buses.

9. The quantum computing device of claim 7, wherein the rows of the qubits are coupled via respective frequency buses of a subset of the plurality of frequency buses.

10. The quantum computing device of claim 7, wherein subsets of the qubits are coupled via respective frequency buses of the plurality of frequency buses.

11. A method of producing a quantum computing device comprising:
    producing a plurality of qubits having respective resonance frequencies, wherein at least two qubits of the plurality of qubits have different resonance frequencies; and
    producing a plurality of frequency buses configured to couple the plurality of qubits; and
    wherein pairs of adjacent qubits of the plurality of qubits having a same resonance frequency are configured to only be coupled via cross-resonance, and pairs of adjacent qubits of the plurality of qubits having different resonance frequencies are configured to only be coupled via respective parametric iSWAP gates, and wherein each pair of adjacent qubits of the plurality of qubits does not have an intervening qubit on an associated frequency bus connecting the pair of adjacent qubits.

12. The method of claim 11, wherein the producing the plurality of frequency buses comprises producing a fixed frequency bus.

13. The method of claim 12, configuring the fixed frequency bus to couple a pair of the pairs of adjacent qubits via cross-resonance.

14. The method of claim 11, wherein the producing the plurality of frequency buses comprises producing a tunable frequency bus.

15. The method of claim 14, wherein the producing the tunable frequency bus comprises configuring the tunable frequency bus to couple a pair of the pairs of adjacent qubits via cross-resonance.

16. The method of claim 14, wherein the producing the tunable frequency bus comprises producing the tunable frequency bus comprising a superconducting quantum interference device.

17. The quantum computing device of claim 11, wherein the producing the plurality of qubits comprises arranging the plurality of qubits in columns and rows.

18. The quantum computing device of claim 17, wherein the producing the plurality of frequency buses comprises coupling columns of the qubits via respective frequency buses of a subset of the plurality of frequency buses.

19. The quantum computing device of claim 17, wherein the producing the plurality of frequency buses comprises coupling rows of the qubits via respective frequency buses of a subset of the plurality of frequency buses.

20. The quantum computing device of claim 17, wherein the producing the plurality of frequency buses comprises coupling subsets of the qubits via respective frequency buses of the plurality of frequency buses.

* * * * *